United States Patent [19]

Cerda

[11] Patent Number: 5,410,353
[45] Date of Patent: Apr. 25, 1995

[54] CAMERA DEVICE FOR IDENTIFYING MARKINGS ON AN ELECTRICAL CABLE

[75] Inventor: Léon G. Cerda, Carry le Rouet, France

[73] Assignee: Societe Anonyme dite : Eurocopter France, Marignane Cedex, France

[21] Appl. No.: 6,725

[22] Filed: Jan. 21, 1993

[30] Foreign Application Priority Data

Jan. 30, 1992 [FR] France ................. 92 01030

[51] Int. Cl.⁶ ............................................. H04N 17/00
[52] U.S. Cl. ................................. 348/180; 348/195; 348/92; 348/94; 382/8
[58] Field of Search ................ 358/107, 101, 93, 106, 358/210; 382/8, 1; 348/180, 195, 135, 142, 86; H04N 17/00

[56] References Cited

U.S. PATENT DOCUMENTS

| | | | |
|---|---|---|---|
| 3,856,377 | 12/1974 | Wildhaber | 350/6 |
| 4,139,306 | 2/1979 | Norton | 358/106 |
| 4,314,168 | 2/1982 | Breitenbach | 310/13 |
| 4,376,582 | 3/1983 | Kirchner et al. | 356/71 |
| 4,596,072 | 6/1986 | Shields | 29/861 |
| 4,764,879 | 8/1988 | Campbell | 364/482 |
| 4,887,155 | 12/1989 | Massen | 358/107 |
| 4,997,994 | 3/1991 | Andrews et al. | 174/112 |
| 5,035,048 | 7/1991 | Piana et al. | 29/809 |
| 5,110,638 | 5/1992 | Vogdes et al. | 425/35.1 |

Primary Examiner—Tommy Chin
Assistant Examiner—Vu Le
Attorney, Agent, or Firm—Marshall, O'Toole, Gerstein, Murray & Borun

[57] ABSTRACT

A device for reading identification marks on an electrical cable (1), including at least one group of signs written longitudinally one after the other on the external surface of a longitudinal portion of the sheath (4) of the cable, includes a lighting assembly (30) and a camera (25) which are capable of forming the image of a longitudinal line of the external surface of the longitudinal sheath portion in order to form, longitudinal line by longitudinal line, the complete peripheral image of the external surface of the longitudinal sheath portion.

9 Claims, 2 Drawing Sheets

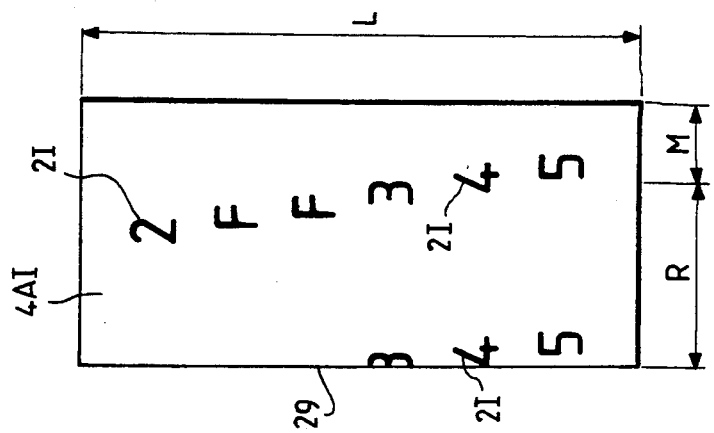
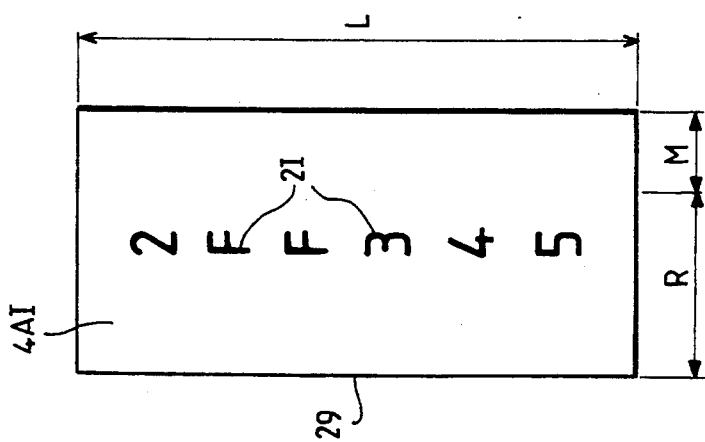
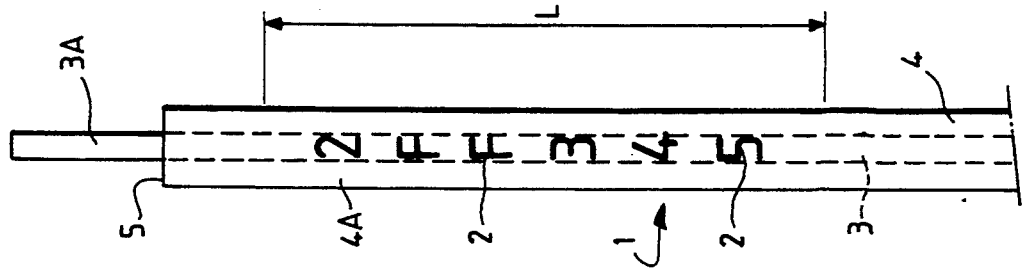

CAMERA DEVICE FOR IDENTIFYING MARKINGS ON AN ELECTRICAL CABLE

The present invention relates to a device for reading the identification marks written spaced out on the external surface of a longitudinal portion of the sheath of an electrical conductor.

It is known that electrical cabling pieces, in particular for helicopters or aeroplanes, comprise a large number of connectors and conductors. It is therefore advantageous to use an automated system facilitating industrial utilization of such cabling. With a view to automating the fabrication of such cabling pieces, generally called harness, each connector, which comprises a plurality of connection locations, is identified by marks, and the same is true for each of its connection locations. Furthermore, each electrical conductor is itself identified by marks.

Thus, by making known to the automated cabling system the marks of an electrical conductor, this system indicates the connector and, more particularly, the connection location of the latter, to which said electrical conductor must be connected.

The identification marks of a conductor are generally made up by groups of signs, like numbers and/or letters, printed spaced out on the external surface of the insulating sheath of said conductor, in particular at the ends of the latter. Thus, an operator reads said identification marks of a conductor and introduces them into the automated system, which provides him with the address of the corresponding connection location of the connector in question.

Such a process is time consuming and tedious. Furthermore, it is not very reliable, because it is tiresome for the operator who must read small marks repeatedly during a working day.

In order to make the acquisition of the identification of an electrical conductor by the automated system automatic, thought has been given to using a bar code. Such a bar code is either printed on the conductor after said marks consisting of letters and numbers, or carried by a label fixed to said conductor.

It is obvious that using such a bar code requires new printing and leads to time losses. Furthermore, the labels are a nuisance during the operations of wiring up onto the connectors.

Also, it would be advantageous to be able to acquire the marks of letters and/or numbers of the conductors automatically and directly. However, this raises numerous technical difficulties, on the one hand because said marks are situated only on a part of the periphery of the sheath of the conductor which is difficult to present reliably to the automatic reader, and, on the other hand, because said sheath may be twisted around the conductor.

The object of the present invention is to solve these problems.

For this purpose, according to the invention, the device for reading the identification marks of an electrical conductor, made up by at least one group of signs written longitudinally one after the other on the external surface of a longitudinal portion of the sheath of said electrical cable, is noteworthy in that it comprises a lighting assembly and a camera which are capable of forming the image of a longitudinal line of the external surface of said longitudinal sheath portion and of rotating around said longitudinal sheath portion in order to form, longitudinal line by longitudinal line, the complete peripheral image of the external surface of said longitudinal sheath portion.

Thus, by virtue of the invention, the sheath portion of the conductor carrying the identification signs is artificially laid flat, so that it is easy to recognize said signals and to determine the identification of the conductor, for example by a known computerized character recognition device.

Preferably, in order to solve the problems of the possible twisting of the sheath, the rotation of the lighting assembly and of the camera around said longitudinal sheath portion is performed over more than 360°, for example over 380°. Thus, even if the sequence of signs is not centered with respect to the initial reading line or alternatively is not exactly parallel to a generatrix of said sheath, the image given by said camera includes all said signs.

Advantageously, in order to impose a minimum degree of straightness on said longitudinal sheath portion and therefore to facilitate the reading of said marks, a transparent stationarytubular guide is provided into which said longitudinal sheath portion is introduced with clearance.

In an advantageous embodiment, the device according to the present invention comprises:
a stationary framework;
a rotor carrying said lighting assembly and said camera and mounted in rotation on said stationary framework with the aid of rotational bearings; and
drive means for driving said rotor in rotation with respect to said framework;
said transparent tubular guide being integral with said framework at said rotational bearings.

Means are advantageously provided for longitudinally fixing said conductor in said guide tube.

When, as is usual, said marks are carried by the end portion of the conductor, at least one detector of the end of said conductor is provided at the end of said transparent guide opposite the one through which said conductor is introduced. Such a detector can control said means for longitudinally fixing the conductor in said transparent guide and/or said rotational drive means.

Preferably, the rotation of said rotor is reversible. Thus, after the reading of the marks by rotation in one sense, the rotor is returned into the initial position by rotation in the reverse sense. The result of this is that it is not necessary to provide a rotating collector between the camera and the system for processing the images which are output therefrom: it is sufficient to provide a connection which is sufficiently flexible in order to allow the reading rotational amplitude of the rotor.

The figures of the attached drawing will make it easier to understand how the invention can be embodied. In these figures, identical references designate similar elements.

FIG. 1 shows, on an enlarged scale, the end part of a conductor.

FIGS. 3 and 4 illustrate the reading obtained by the device of the invention, in two possible cases of positioning of identification marks.

Figure 2:
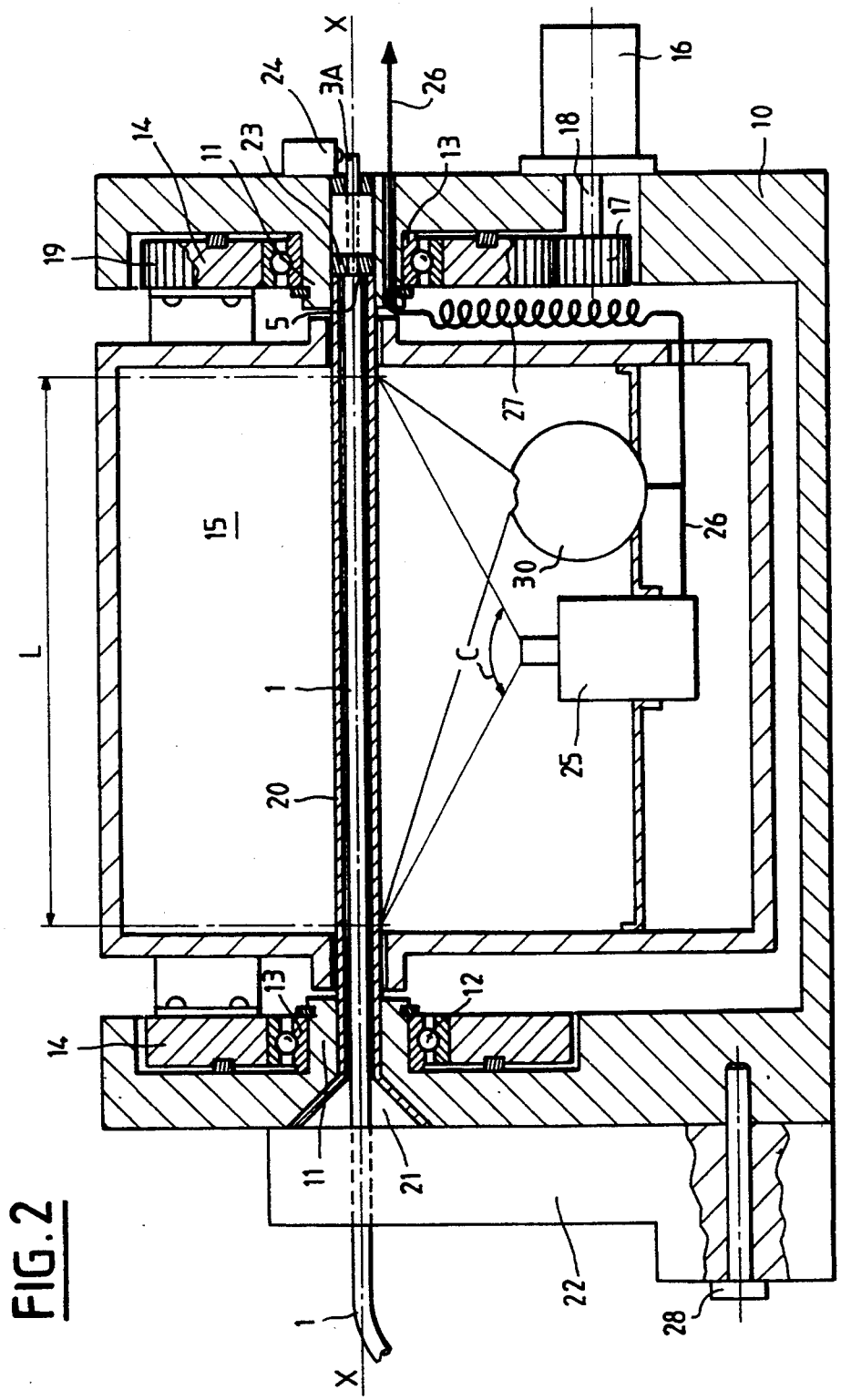
FIG. 2 is a diagrammatic sectional view of a device according to the present invention.

The electrical conductor end portion 1, shown by FIG. 1, comprises a group of signs 2 forming an identification mark of said cable. This cable, in the usual manner, is made up by a conducting core 3 coated in an insulating sheath 4. In FIG. 1, the endmost part of the sheath 4 has been removed so that the end 3A of the core 3 can be seen and a shoulder 5 is formed between this stripped core part 3A and the sheath 4.

As can be seen, the signs 2—made up for example of letters and numbers—are written longitudinally one after the other on the external surface of the end portion of the sheath 4. More precisely, the signs 2 are at least approximately aligned along a generatrix of said sheath portion 4 and the group of said signs is contained within a longitudinal portion 4A of said sheath, of length L.

The reading device according to the present invention and shown diagrammatically in section in FIG. 2, comprises a framework 10 provided with two aligned bearings 11 defining an axis X—X. There is associated with each of said bearings 11 a rolling bearing 12 whose internal collar 13 is integral with said bearing. The external collars of the rolling bearings 12 are integral with peripheral collars 14, themselves integral with a rotor 15 which is capable of rotating around the axis X—X.

Furthermore, an electric motor 16 carried by the framework 10 is capable of driving said rotor 15 in rotation around the axis X—X, by virtue of a pinion 17 set on the shaft 18 and meshing with toothing 19, carried by the periphery of the external collar 14 of one of the two rolling bearings 12.

A rigid and transparent tube 20, arranged coaxially with the axis X—X, connects said bearings 11 and is integral with the framework 10, so that said rotor 15 rotates around said stationary rigid tube 20.

At one end of the tube 20 are provided an introduction widening 21, as well as a device 22 for locking said conductor in translation. The device 22, represented highly schematically, may be of any known type; for example it may consist of a clamp with two jaws, each of which pivots around a spindle 28 connected to the framework 10. The opening and closing of the clamps of the device 22 are controlled by electrical means, for example an electromagnet (not represented).

At the other end of the tube 20 are arranged an end-stop detector 23 and a proximity detector 24.

Furthermore, inside the rotor 15 are mounted a lighting device 30 and a camera 25 which are linked in rotation with said rotor around the axis X—X. This camera 25 is capable of receiving the image of a line parallel to the axis X—X. It is advantageously of the CCD type and it is connected to the outside of the device via a wire linkage 26, having a zone 27 of high flexibility in extension between the rotor 15 and the framework 10.

The field C of said camera 25 encompasses, at the axis X—X, a length at least equal to the length L of the sheath portion 4A on which the group of identification signs 2 is written.

The device in FIG. 2 operates in the following manner.

The jaws of the device 22 are spaced apart, the widening 21 is freed and it is possible to introduce therein the end 1 of the cable 3,4. This end 1 is pushed into the tube 20 until the shoulder 5 abuts against the detector 23 and the end of the stripped core part 3A is opposite the detector 23. In this position, the portion 4A of the sheath 4 is encompassed by the field C of the camera 25. Furthermore, the detectors 23 and 24 actuate, on the one hand, the control means of the clamps 22, which are brought together in order to press between them the end portion 1, locking it in translation in the tube 20, and on the other hand, the motor 16.

Subsequently, the rotor 15 is driven, from its initial position, in rotation by the motor 16 around the axis X—X, the lighting device 30 is actuated, and the camera 25 can form, line by line, the image 4AI of the segment 4A comprising the images 2I of the signs 2 (see FIG. 3 which shows the image 4AI in developed form).

This image is transmitted to a computerized processing and reading system (not represented) which is outside the reading device 10 to 25, via the wire linkage 26, whose flexible part 27 allows the rotation of the rotor 15 with respect to the framework 10. Said processing and reading system therefore identifies the cable 3, 4.

This identification may be used by the automated cabling system which will then indicate the connector and the connection location of the latter, to which the stripped core part 3A must be connected. It may also be used to control any other operation, whether automated or not, on said cable 3, 4 which has thus been identified.

In FIG. 3, it is assumed that the signs 2 were aligned longitudinally along a generatrix of the sheath 4 and that the line 29 for the start of reading by the camera 25 was outside the group of said signs. The result of this is that on the image 4AI, the images 25 are aligned and appear in their entirety.

However, it could be possible for the line 29 for the start of reading by the camera 25 to cut said signs 2, or alternatively (see FIG. 4) for the sheath 4 to be twisted around the core 3, so that the signs 2 are angularly offset with respect to each other around said core. In order to obtain a complete image of said signs, according to a characteristic of the present invention, the reading rotary displacement of the camera 25 around the segment 4A is greater than 360°. In FIGS. 3 and 4, the development corresponding to a reading displacement of 360° has been indicated by R, and an additional margin, for example of the order of 20° has been indicated by M.

By virtue of this arrangement, all the images 2I of all the signs 2 of the identification group are certain to be obtained uncut on the image 4AI.

The reading displacement R+M of the rotor 15 is limited, for example by an end-stop switch (not represented) disposed on the stationary framework 10 and interacting with a stop carried by the rotor 15. This end-stop switch controls the reversing of the sense of rotation of the motor 16, so that after the phase of reading the signs 2, described above, the rotor 15 is returned into the initial position.

The return into the initial position controls the opening of the jaws of the device 22, so that the cable 3, 4 may be removed from the tube 20.

Another reading process may then be carried out.

I claim:

1. A device for reading identification marks on an electrical cable (3, 4) comprising at least one group of axially spaced signs (2) on the external surface of a longitudinal portion (4A) of the sheath (4) of said electrical cable, said device comprising:
- a supporting frame (10);
- a transparent tubular guide (20) in which said longitudinal sheath portion (4A) can be inserted with clearance, said tubular guide being fixed to said frame (10);
- a rotor (15) overlapping said guide and mounted on said frame (10) for rotation around said guide;
- a lighting assembly (30) and a camera (25) carried by said rotor (15) for forming an image of a longitudinal line on the external surface of a cable which is inserted into said transparent stationary tubular guide (20), whereby a complete peripheral image (4AI) of said external surface is formed, longitudinal line by longitudinal line, when said rotor is rotated around said transparent tubular guide; and drive means (16) for rotating said rotor (15) relative to said frame (10) about said tubular guide.

2. The device as claimed in claim 1, which comprises means (22) for axially locking said conductor (3, 4) in said guide tube (20).

3. A device as claimed in claim 2, wherein said detector (23, 24) controls said means (22) for axially locking the conductor in said transparent guide (20).

4. The device as claimed in claim 2, wherein said detector (23, 24) controls said drive means (16) in order to drive said rotor (15) in rotation.

5. The device as claimed in claim 1, wherein the rotation of the lighting assembly (30) and of the camera (25) around said longitudinal sheath portion (4A) is performed over more than 360°.

6. The device as claimed in claim 5, wherein the rotation of the lighting assembly (30) and of the camera (25) around said longitudinal sheath portion (4A) is performed over approximately 380°.

7. The device as claimed in claim 1, for said cable (3, 4) in which said marks (2) are located at an end portion (1) of said cable (3, 4), said device comprising at least one detector (23, 24) for detecting the end of said conductor (3, 4), at the end of said transparent guide (20) opposite the one (21) through which said conductor is introduced.

8. The device as claimed in claim 1, wherein the rotation of said rotor (15) is reversible.

9. The device as claimed in claim 1, wherein said camera (25) delivers signals to the exterior of said device (10) through a wire linkage (26) which is flexible to permit rotation of said rotor (15) sufficient to obtain the desired peripheral image of said cable.

* * * * *